United States Patent
Shveidel et al.

(10) Patent No.: US 11,042,296 B1
(45) Date of Patent: Jun. 22, 2021

(54) SYSTEM AND METHOD OF HANDLING JOURNAL SPACE IN A STORAGE CLUSTER WITH MULTIPLE DELTA LOG INSTANCES

(71) Applicant: EMC IP Holding Company LLC, Hopkinton, MA (US)

(72) Inventors: Vladimir Shveidel, Pardes-Hana (IL); Dror Zalstein, Givatayim (IL); Dennis Rusakov, Rishon Lezion (IL); Adi Katzengold, Ramat Gan (IL); Bar David, Rishon Lezion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/818,008

(22) Filed: Mar. 13, 2020

(51) Int. Cl.
*G06F 3/06* (2006.01)
*G06F 12/02* (2006.01)

(52) U.S. Cl.
CPC ............ *G06F 3/0602* (2013.01); *G06F 3/067* (2013.01); *G06F 3/0655* (2013.01); *G06F 12/023* (2013.01); *G06F 2212/154* (2013.01)

(58) Field of Classification Search
None
See application file for complete search history.

(56) References Cited

U.S. PATENT DOCUMENTS

| | | | |
|---|---|---|---|
| 7,685,360 B1 * | 3/2010 | Brunnett | G06F 3/064 711/112 |
| 7,916,421 B1 * | 3/2011 | Liikanen | G11B 19/045 360/77.01 |
| 9,015,212 B2 * | 4/2015 | David | G06F 16/18 707/827 |
| 9,021,303 B1 | 4/2015 | Desouter et al. | |
| 9,778,881 B2 | 10/2017 | Romanovskiy | |
| 9,959,054 B1 | 5/2018 | Vankamamidi et al. | |
| 10,223,206 B1 | 3/2019 | Dobrean et al. | |
| 10,235,066 B1 | 3/2019 | Chen et al. | |
| 10,540,114 B2 | 1/2020 | Lv et al. | |

(Continued)

OTHER PUBLICATIONS

Shveidel, et al.; "Efficient Handling of Highly Amortized Metadata Page Updates in Storage Clusters With Delta Log-Based Architectures," U.S. Appl. No. 16/742,076, filed Jan. 14, 2020.

(Continued)

*Primary Examiner* — Brian R Peugh
(74) *Attorney, Agent, or Firm* — BainwoodHuang

(57) ABSTRACT

Techniques for handling journal space in a storage cluster with multiple delta log instances. The techniques include writing delta updates for a respective metadata type to an "active" set of data containers in a delta log instance and raw delta updates to a raw delta log, switching a designation of the "active" set of data containers from "active" to "de-staging" once one or more of the "active" set of data containers has been filled, writing a bookmark for the respective metadata type to the raw delta log and a bookmark list, determining that a de-staging operation has been completed for writing the delta updates from the "de-staging" set of data containers to a storage array, determining that the bookmark for the respective metadata type is the oldest bookmark in the list, and reclaiming space between a tail of the raw delta log and the bookmark written to the raw delta log.

20 Claims, 6 Drawing Sheets

(56) References Cited

U.S. PATENT DOCUMENTS

2005/0216669 A1* 9/2005 Zhu .................. G06F 3/064
       711/118
2016/0199731 A1* 7/2016 Mamtani ............. A63F 13/35
       463/42

OTHER PUBLICATIONS

Gazit, et al.; "Hiccup-Less Failback and Journal Recovery in an Active-Active Storage System," U.S. Appl. No. 16/819,336, filed Mar. 16, 2020.

* cited by examiner

SYSTEM AND METHOD OF HANDLING JOURNAL SPACE IN A STORAGE CLUSTER WITH MULTIPLE DELTA LOG INSTANCES

BACKGROUND

Clustered storage systems (also referred to herein as "storage clusters") employ various techniques and/or methodologies to protect and/or distribute electronic data and/or metadata. In response to receipt of a write input/output (IO) request for a storage object (e.g., a volume, a logical unit (LU), a file system) from a host computer, a data storage processor (also referred to herein as a "storage node") of a storage cluster may write pending changes (also referred to herein as "deltas" or "delta updates") associated with a metadata page to a journal in local memory before storing the metadata delta updates to a storage array. Once the metadata delta updates have been written to the journal, the storage node sends an acknowledgement message to the host computer that issued the write IO request. The storage node subsequently stores the delta updates to the associated metadata page in the storage array.

SUMMARY

In a storage cluster, a storage node can write metadata delta updates to both a metadata delta log in volatile memory and a journal in persistent memory (collectively referred to herein as the "delta log infrastructure"). The metadata delta log in the volatile memory can include a first set of data containers and a second set of data containers. Each data container of the first and second sets can be associated with a respective metadata page. A storage node of the storage cluster can write delta updates associated with a metadata page to the metadata delta log in the volatile memory, filling one or more of the first set of data containers with the metadata delta updates. The first set of data containers receiving the metadata delta updates can be designated as the "active" set of data containers, and the second set of data containers can be designated as the "de-staging" set of data containers. The storage node can also write copies of metadata delta updates (also referred to herein as "raw delta updates") to the journal (also referred to herein as the "raw delta log") in the persistent memory.

Once one or more of the active set of data containers have been filled, the "active" and "de-staging" designations of the respective first and second sets of data containers can be switched. In other words, the "active" designation of the first set of data containers can be switched to the "de-staging" designation, and the "de-staging" designation of the second set of data containers can be switched to the "active" designation. In response to switching the "active" and "de-staging" designations of the respective first and second sets of data containers, additional delta updates associated with a metadata page can be written to fill one or more of the current designated "active" set of data containers. Further, the metadata delta updates written to the current designated "de-staging" set of data containers can be stored to a storage array, and allocated space in the raw delta log storing the raw delta updates can be reclaimed.

In such a storage cluster, a storage node can write delta updates for different types of metadata to the delta log infrastructure. For example, the different metadata types can include reference count metadata that specify reference counts to storage objects in the storage cluster, mapping metadata such as logical-to-virtual and/or virtual-to-physical mapping metadata, and/or any other suitable metadata type(s). Because different metadata types can have different amortization rates, different metadata size parameters, and so on, the delta log infrastructure can be optimized for handling the different metadata types. For example, a metadata delta log instance can be provided and optimized for each metadata type. Further, each metadata delta log instance can have its own associated raw delta log.

However, such a configuration of the delta log infrastructure has shortcomings due at least in part to increased write amplification and/or increased recovery complexity. For example, in such a configuration, one or more IO transactions can include writing raw delta updates for multiple metadata types to multiple raw delta logs. Because raw delta updates written to multiple raw delta logs in one or more IO transactions can be dependent upon one another, recovery mechanisms for recovering the delta log infrastructure to a consistent state can be highly complex. At least some of theses shortcomings can be addressed by alternatively configuring the delta log infrastructure to include a single raw delta log for use with multiple delta log instances. However, such an alternative configuration of the delta log infrastructure also has shortcomings due to difficulties in safely reclaiming allocated space in the single raw delta log.

Techniques are disclosed herein for handling journal space in a storage cluster with multiple delta log instances. The storage cluster can include a plurality of storage nodes, in which each storage node can include multiple instances of metadata delta logs in volatile memory and a single journal ("raw delta log") in persistent memory. Each metadata delta log can include a first set of data containers initially designated as the "active" set of data containers, and a second set of data containers initially designated as the "de-staging" set of data containers. Each metadata delta log can also be optimized for handling a particular type of metadata. In the disclosed techniques, a storage node can receive a plurality of write IO requests for one or more storage objects from one or more host computers. The plurality of write IO requests can direct the storage node to write pending changes ("deltas," "delta updates") for one or more different metadata types to the respective metadata delta logs.

In response to receipt of the plurality of write IO requests, the storage node can write delta updates for each respective metadata type to a metadata delta log optimized for handling the respective metadata type, filling one or more of the current designated "active" set of data containers with the metadata delta updates. The storage node can also write copies of metadata delta updates ("raw delta updates") to the single raw delta log to persist them for use in recovering the respective metadata delta logs to a consistent state in the event of a disaster, data loss, and/or data corruption. Once one or more of the active set of data containers of the metadata delta log have been filled, the storage node can switch the designation of the current designated "active" set of data containers from "active" to "de-staging," as well as switch the designation of the current designated "de-staging" set of data containers from "de-staging" to "active." Further, once the "active" and "de-staging" designations have been switched, the storage node can write a bookmark to the raw delta log in the persistent memory, as well as to a bookmark list in the volatile memory. In certain implementations, the bookmark can be configured as a record having several attributes, including a "type" attribute specifying the respective metadata type handled by the metadata delta log, an "identifier" attribute specifying the current designated "active" set of data containers included in the metadata delta log, and an "offset" attribute specifying the current allocation offset in the raw delta log.

Once "active" and "de-staging" designations of one or more sets of data containers have been switched for the respective metadata delta logs, and bookmarks have been written to each of the raw delta log and the bookmark list, the storage node can initiate de-staging operations to be performed in a background process. The storage node can then determine whether at least a first de-staging operation for delta updates of a first metadata type and a second de-staging operation for delta updates of a second metadata type have been performed in the background process. If the storage node determines that the first de-staging operation has been performed before the second de-staging operation, then the storage node can remove a first bookmark specifying the first metadata type from the bookmark list, checking to see whether the first bookmark was removed from a tail of the bookmark list. If the first bookmark was indeed removed from the tail of the bookmark list (i.e., the first bookmark was the "oldest" bookmark in the bookmark list), then the storage node can perform a memory space reclaim operation to reclaim the space between a tail of the raw delta log and the first bookmark written to the raw delta log.

If the storage node determines that the second de-staging operation has been performed before the first de-staging operation, then the storage node can remove a second bookmark specifying the second metadata type from the bookmark list, checking to see whether the second bookmark was removed from the tail of the bookmark list. If the second bookmark was not removed from the tail of the bookmark list (i.e., the first bookmark remains at the tail of the bookmark list), then the storage node can defer performing a memory space reclaim operation on the raw delta log until the first de-staging operation for delta updates of the first metadata type has been performed in the background process. In this way, memory space reclamation can be more safely performed in a storage node that includes multiple instances of metadata delta logs and a single raw delta log.

In certain embodiments, a method of handling journal space in a storage cluster with multiple delta log instances includes writing delta updates of a first metadata type to both a respective set of data containers in a first delta log instance and a raw delta log, and, in response to one or more of the respective set of data containers in the first delta log instance being filled with at least some of the delta updates, writing a first bookmark for the first metadata type to both the raw delta log and a bookmark list. The method further includes, in response to a first de-staging operation being performed for writing the delta updates filling one or more of the respective set of data containers in the first delta log instance to a storage array: if the first bookmark is determined to be an oldest bookmark in the bookmark list, reclaiming at least first space between a tail of the raw delta log and the first bookmark written to the raw delta log; and if the first bookmark is determined not to be the oldest bookmark in the bookmark list, deferring the reclaiming of the first space in the raw delta log.

In certain arrangements, the method further includes, in further response to the first de-staging operation being performed for writing the delta updates filling one or more of the respective set of data containers in the first delta log instance to the storage array, removing the first bookmark for the first metadata type from the bookmark list.

In certain arrangements, the method further includes writing delta updates of a second metadata type to both a respective set of data containers in a second delta log instance and the raw delta log, and, in response to one or more of the respective set of data containers in the second delta log instance being filled with at least some of the delta updates, writing a second bookmark for the second metadata type to both the raw delta log and the bookmark list.

In certain arrangements, the method further includes, in response to a second de-staging operation being performed for writing the delta updates filling one or more of the respective set of data containers in the second delta log instance to the storage array: determining that the second bookmark is not the oldest bookmark in the bookmark list; and, deferring reclaiming second space in the raw delta log.

In certain arrangements, the method further includes, in further response to the first de-staging operation being performed for writing the delta updates filling one or more of the respective set of data containers in the first delta log instance to the storage array: determining that the first bookmark is the oldest bookmark in the bookmark list; and reclaiming at least the first space and the second space between the tail of the raw delta log and the second bookmark written to the raw delta log.

In certain arrangements, the method further includes setting a threshold specifying a minimum allowed free space in the raw delta log.

In certain arrangements, the method further includes determining that free space in the raw delta log is below the set threshold, and forcing at least the first de-staging operation to be performed for writing the delta updates filling one or more of the respective set of data containers in the first delta log instance to the storage array.

In certain embodiments, a storage node of a storage cluster includes a volatile memory including a first delta log instance and a bookmark list, the first delta log instance having a respective set of data containers; a persistent memory including a raw delta log; and, processing circuitry configured to execute program instructions to write delta updates of a first metadata type to both the respective set of data containers in the first delta log instance and the raw delta log, and, in response to one or more of the respective set of data containers in the first delta log instance being filled with at least some of the delta updates, to write a first bookmark for the first metadata type to both the raw delta log and the bookmark list. The processing circuitry is further configured to execute the program instructions, in response to a first de-staging operation being performed for writing the delta updates filling one or more of the respective set of data containers in the first delta log instance to a storage array: if the first bookmark is determined to be an oldest bookmark in the bookmark list, to reclaim at least first space between a tail of the raw delta log and the first bookmark written to the raw delta log; and, if the first bookmark is determined not to be the oldest bookmark in the bookmark list, to defer the reclaiming of the first space in the raw delta log.

In certain arrangements, the processing circuitry is further configured to execute the program instructions, in further response to the first de-staging operation being performed for writing the delta updates filling one or more of the respective set of data containers in the first delta log instance to the storage array, to remove the first bookmark for the first metadata type from the bookmark list.

In certain arrangements, the processing circuitry is further configured to execute the program instructions to write delta updates of a second metadata type to both a respective set of data containers in a second delta log instance and the raw delta log, and, in response to one or more of the respective set of data containers in the second delta log instance being filled with at least some of the delta updates, to write a second bookmark for the second metadata type to both the raw delta log and the bookmark list.

In certain arrangements, the processing circuitry is further configured to execute the program instructions, in response to a second de-staging operation being performed for writing the delta updates filling one or more of the respective set of data containers in the second delta log instance to the storage array: to determine that the second bookmark is not the oldest bookmark in the bookmark list; and, to defer reclaiming second space in the raw delta log.

In certain arrangements, the processing circuitry is further configured to execute the program instructions, in further response to the first de-staging operation being performed for writing the delta updates filling one or more of the respective set of data containers in the first delta log instance to the storage array: to determine that the first bookmark is the oldest bookmark in the bookmark list; and, to reclaim at least the first space and the second space between the tail of the raw delta log and the second bookmark written to the raw delta log.

In certain arrangements, the raw delta log is configured as a ring buffer having a head and a tail, and the processing circuitry is further configured to execute the program instructions to write the delta updates of the first metadata type at the head of the raw delta log.

In certain arrangements, the processing circuitry is further configured to execute the program instructions to write the first bookmark for the first metadata type at the head of the raw delta log.

In certain arrangements, the bookmark list is configured as a linked list having a head and a tail, and the processing circuitry is further configured to execute the program instructions to write the first bookmark for the first metadata type at the head of the linked list.

In certain arrangements, the processing circuitry is further configured to execute the program instructions to set a threshold specifying a minimum allowed free space in the raw delta log.

In certain arrangements, the processing circuitry is further configured to execute the program instructions to determine that free space in the raw delta log is below the set threshold, and to force at least the first de-staging operation to be performed for writing the delta updates filling one or more of the respective set of data containers in the first delta log instance to the storage array.

In certain embodiments, a computer program product including a set of non-transitory, computer-readable media having instructions that, when executed by processing circuitry, cause the processing circuitry to perform a method that includes writing delta updates of a first metadata type to both a respective set of data containers in a first delta log instance and a raw delta log, and, in response to one or more of the respective set of data containers in the first delta log instance being filled with at least some of the delta updates, writing a first bookmark for the first metadata type to both the raw delta log and a bookmark list. The method further includes, in response to a first de-staging operation being performed for writing the delta updates filling one or more of the respective set of data containers in the first delta log instance to a storage array: if the first bookmark is determined to be an oldest bookmark in the bookmark list, reclaiming at least first space between a tail of the raw delta log and the first bookmark written to the raw delta log; and, if the first bookmark is determined not to be the oldest bookmark in the bookmark list, deferring the reclaiming of the first space in the raw delta log.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for handling journal space in a storage cluster with multiple delta log instances. The disclosed techniques can include writing delta updates for a respective type of metadata to a current designated "active" set of data containers in a metadata delta log instance and raw delta updates for respective metadata types to a raw delta log, switching a designation of the current designated "active" set of data containers from "active" to "de-staging" once one or more of the current designated "active" set of data containers has been filled, and writing a bookmark for the respective metadata type to both the raw delta log and a bookmark list. The disclosed techniques can further include determining that a de-staging operation has been performed in a background process for writing the delta updates from the current designated "de-staging" set of data containers to a storage array, removing the bookmark for the respective metadata type from the bookmark list, determining that the removed bookmark was the "oldest" bookmark in the list, and reclaiming the space between a tail of the raw delta log and the bookmark written to the raw delta log. In this way, memory space reclamation can be more safely performed in a storage node that includes multiple delta log instances and a single raw delta log.

Figure 1:
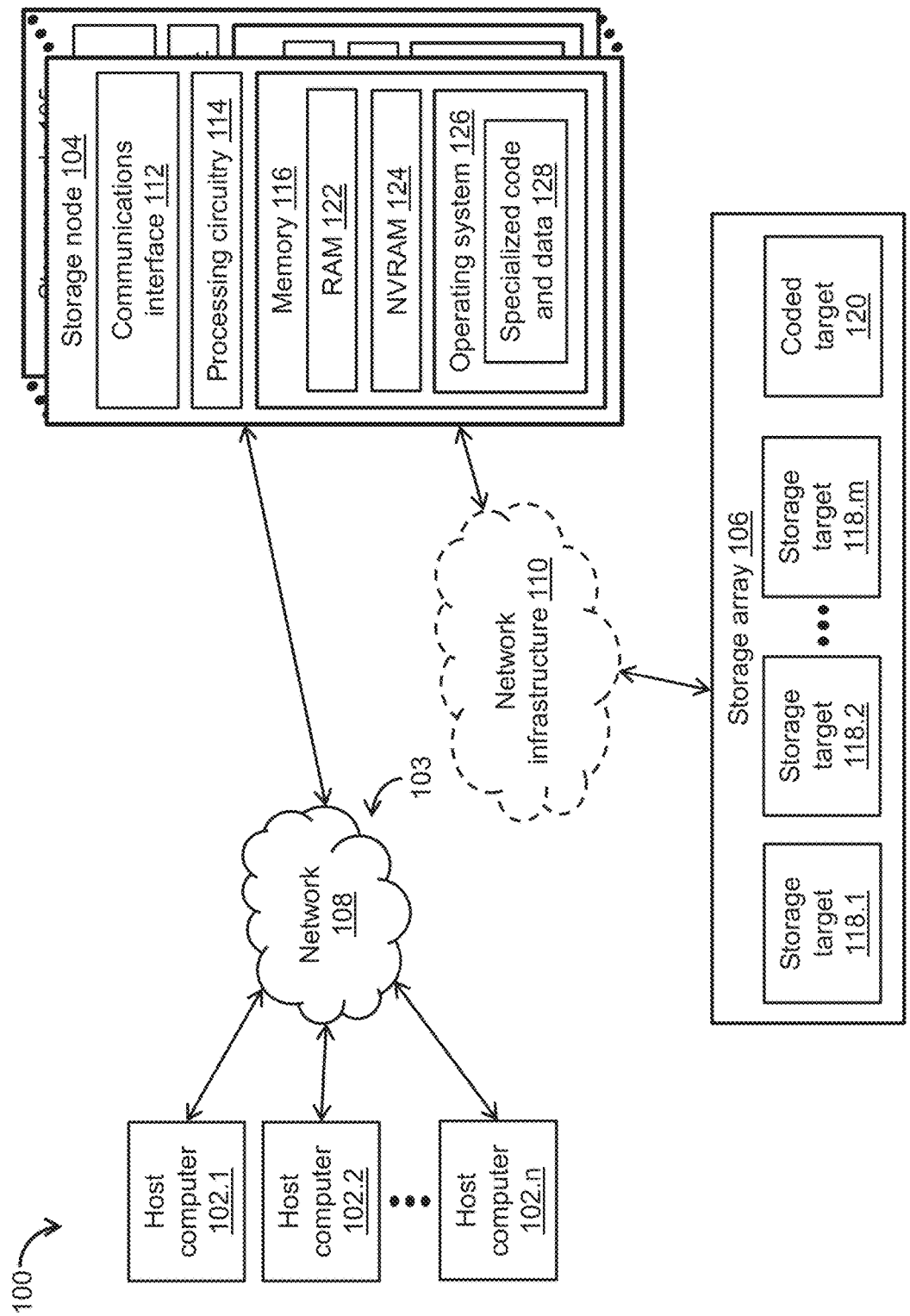
FIG. 1 is a block diagram of an exemplary data storage environment, in which techniques can be practiced for handling journal space in a storage cluster with multiple delta log instances.

FIG. 1 depicts an illustrative embodiment of an exemplary data storage environment 100, in which techniques can be practiced for handling journal space in a storage cluster with multiple delta log instances. As shown in FIG. 1, the data storage environment 100 can include a plurality of host computers 102.1, 102.2, . . . , 102.n, at least one data storage processor 104 (also referred to herein as a "storage node"), a storage array 106, and a communications medium 103 that includes at least one network 108. For example, each of the plurality of host computers 102.1, . . . , 102.n can be configured as a web server computer, a file server computer, an email server computer, an enterprise server computer, and/or any other suitable client/server computer or computerized device. The plurality of host computers 102.1, . . . , 102.n can be configured to provide, over the network 108, storage input/output (IO) requests (e.g., small computer system interface (SCSI) commands, network file system (NFS) commands) to the storage node 104. Such storage IO requests (e.g., write IO requests, read IO requests) can direct the storage node 104 to write and/or read data blocks, data pages, data files, or any other suitable data elements to/from volumes (VOLs), logical units (LUs), file systems, and/or any other suitable storage targets, such as a plurality of storage targets 118.1, 118.2, . . . , 118.m maintained in the storage array 106.

The communications medium 103 can be configured to interconnect the plurality of host computers 102.1, . . . , 102.n with the storage node 104 to enable them to communicate and exchange data and/or control signaling. As shown in FIG. 1, the communications medium 103 can be illustrated as a "cloud" to represent different communications topologies such as a backbone topology, a hub-and-spoke topology, a loop topology, an irregular topology, and so on, or any suitable combination thereof. As such, the communications medium 103 can include copper-based data communications devices and cabling, fiber optic devices and cabling, wireless devices, and so on, or any suitable combination thereof. The communications medium 103 can be further configured to support storage area network (SAN)-based communications, network attached storage (NAS)-based communications, local area network (LAN)-based communications, metropolitan area network (MAN)-based communications, wide area network (WAN)-based communications, wireless communications, distributed infrastructure communications, and/or any other suitable communications.

The storage node 104 can be connected directly to the storage array 106 or by an optional network infrastructure 110, which can include an Ethernet network, an InfiniBand network, a fiber channel network, and/or any other suitable network(s). As shown in FIG. 1, the storage node 104 can include a communications interface 112, processing circuitry 114, and a memory 116. The communications interface 112 can include one or more of an Ethernet interface, an InfiniBand interface, a fiber channel interface, and/or any other suitable communications interface. The communications interface 112 can further include SCSI target adapters, network interface adapters, and/or any other suitable adapters for converting electronic, optical, and/or wireless signals received over the network 108 to a form suitable for use by the processing circuitry 114.

The memory 116 can include volatile memory such as a random-access memory (RAM) 122 or any other suitable volatile memory, as well as persistent memory such as a nonvolatile random-access memory (NVRAM) 124 or any other suitable persistent memory. The memory 116 can also store a variety of software constructs realized in the form of specialized code and data 128 (e.g., program instructions) that can be executed by the processing circuitry 114 to carry out the techniques and/or methods disclosed herein. The memory 116 can further include an operating system 126, such as a Linux operating system (OS), a Unix OS, a Windows OS, or any other suitable operating system.

The processing circuitry 114 can include one or more physical storage processors and/or engines configured to execute the specialized code and data 128, as well as data movers, director boards, blades, IO modules, storage drive controllers, switches, and/or any other suitable computer hardware or combination thereof. For example, the processing circuitry 114 can execute the specialized code and data 128 as program instructions out of the memory 116, process storage IO requests (e.g., write IO requests, read IO requests) issued by the respective host computers 102.1, . . . , 102.n, and/or store data and/or metadata to the storage array 106 in the data storage environment 100, which can be a clustered RAID environment.

As shown in FIG. 1, the storage array 106 can include a coded target 120, which can be configured to store coded data for use in regenerating lost or corrupted data on one or more of the storage targets 118.1, 118.2, . . . , 118.m. In certain implementations, the coded target 120 can be stored to a hard disk drive (HDD) configured to store parity data in a RAID array. Alternatively (or in addition), the storage targets 118.1, 118.2, . . . , 118.m and the coded target 120 can be stored to one or more HDDs, solid state drives (SSDs), flash devices, and/or any other suitable storage device(s). It is noted that the storage node 104 can include a keyboard, a mouse, and/or any other suitable 10 device(s), an uninterruptable power supply (UPS), and/or any other suitable storage node component(s).

In the context of the processing circuitry 114 being implemented using one or more processors executing the specialized code and data 128, a computer program product can be configured to deliver all or a portion of the specialized code and data 128 to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques and/or methods disclosed herein.

Figure 2:
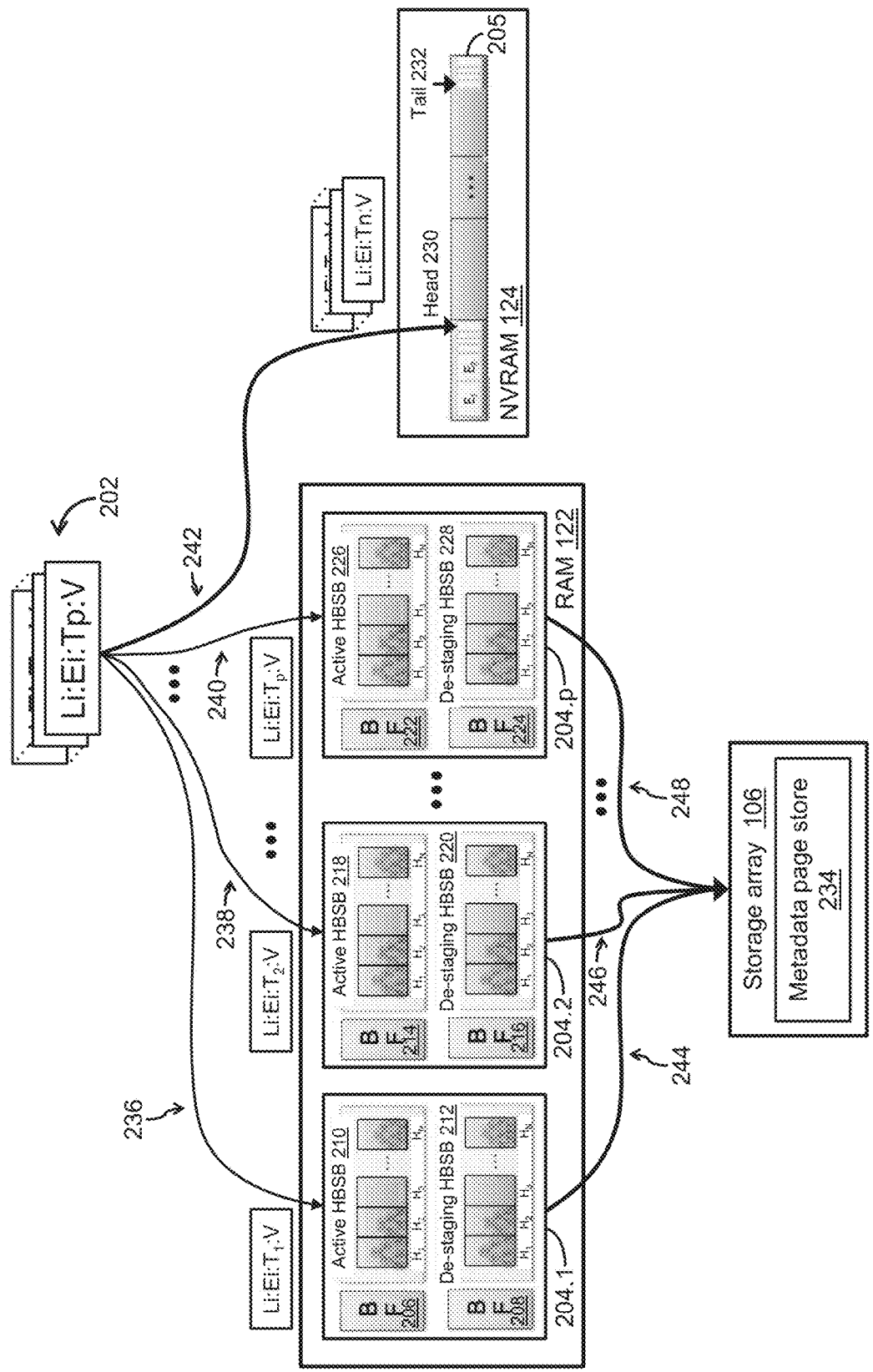
FIG. 2 is a block diagram of volatile memory, persistent memory, and storage array components of a storage node in the data storage environment of FIG. 1.

FIG. 2 depicts volatile memory, persistent memory, and storage array components that can be included in the storage node 104 of FIG. 1. As shown in FIG. 2, the volatile memory components can be embodied in the RAM 122, and include multiple instances of metadata delta logs 204.1, 204.2, . . . , 204.p. The metadata delta log 204.1 can include a first set 210 of data buckets (also referred to herein as data "containers") $H_1$, $H_2$, $H_3$, . . . , $H_N$ (in which "N" is any suitable positive integer) and an associated bloom filter (BF) 206, as well as a second set 212 of data buckets ("containers") $H_1$, $H_2$, $H_3$, . . . , $H_N$ and an associated bloom filter (BF) 208. Likewise, the metadata delta log 204.2 can include a first set 218 of data buckets ("containers") $H_1$, $H_2$, $H_3$, . . . , $H_N$ and an associated bloom filter (BF) 214, as well as a second set 220 of data buckets ("containers") $H_1$, $H_2$, $H_3$, . . . , $H_N$ and an associated bloom filter (BF) 216. In general, the metadata delta log 204.p (in which "p" is any suitable positive integer) can include a first set 226 of data buckets ("containers") $H_1$, $H_2$, $H_3$, . . . , $H_N$ and an associated bloom filter (BF) 222, as well as a second set 228 of data buckets ("containers") $H_1$, $H_2$, $H_3$, . . . , $H_N$ and an associated bloom filter (BF) 224. Each of the first and second sets of data containers $H_1$, $H_2$, $H_3$, . . . , $H_N$ included in the respective metadata delta logs 204.1, . . . , 204.p can be configured to store delta updates to metadata pages. For example, each of the data containers $H_1$, $H_2$, $H_3$, . . . , $H_N$ can be configured as a binary tree ("b-tree") structure or any other suitable data structure.

As described herein, the processing circuitry 114 of the storage node 104 can execute the specialized code and data 128 as program instructions out of the memory 116, and process storage IO requests (e.g., write IO requests, read IO requests) issued by the respective host computers 102.1, . . . , 102.n to write/read data and/or metadata to/from the storage array 106. For example, each portion of metadata (e.g., each metadata delta update) can be stored to a metadata page on the storage array 106. Further, each metadata delta update can specify a change to a metadata page on the storage array 106.

In certain implementations, the storage node 104 can convert a plurality of metadata delta updates into a plurality of delta update tuples 202, respectively. As shown in FIG. 2, each of the plurality of delta update tuples 202 can include several tuple parameters, such as a logical index "Li" of a corresponding metadata page "i," an entry index "Ei" that refers to a specific delta update entry or offset within the metadata page "i," a record or delta type "Tp" that defines the size or type "p" of the delta update entry, and a payload or value "V" of the delta update entry. The storage node 104 can also write delta update tuples for particular delta types $T_1, T_2, \ldots, T_p$ to the metadata delta logs 204.1, ..., 204.p, respectively, in the volatile memory (i.e., the RAM 122). For example, the storage node 104 can write delta update tuples "Li:Ei:$T_1$:V" to the metadata delta log 204.1 (as illustrated by a path 236), as well as write delta update tuples "Li:Ei:$T_2$:V" to the metadata delta log 204.2 (as illustrated by a path 238). In general, the storage node 104 can write delta update tuples "Li:Ei:$T_p$:V" to the metadata delta log 204.p (as illustrated by a path 240), in which "p" is any suitable positive integer. The storage node 104 can subsequently store the delta update tuples written to the metadata delta logs 204.1, 204.2, ..., 204.p to a metadata page store 234 (as illustrated by paths 244, 246, ..., 248, respectively) included in the storage array 106.

In certain implementations, the storage node 104 can determine the target data containers $H_1, H_2, H_3, \ldots,$ or $H_N$ for the respective delta update tuples Li:Ei:$T_1$:V in the first set 210 of data containers included in the metadata delta log 204.1 based on a predetermined hash function of the logical index "Li" of the corresponding metadata page. Likewise, the storage node 104 can determine the target data containers $H_1, H_2, H_3, \ldots,$ or $H_N$ for the respective delta update tuples Li:Ei:$T_2$:V in the first set 218 of data containers included in the metadata delta log 204.2 based on a predetermined hash function of the logical index "Li" of the corresponding metadata page. In general, the storage node 104 can determine the target data containers $H_1, H_2, H_3, \ldots,$ or $H_N$ for the respective delta update tuples Li:Ei:$T_p$:V in the first set 226 of data containers included in the metadata delta log 204.p (in which "p" is any suitable positive integer) based on a predetermined hash function of the logical index "Li" of the corresponding metadata page. In such implementations, the various data containers $H_1, \ldots, H_N$ included in the respective metadata delta logs 204.1, ..., 204.p can be referred to as hash-based sorted buckets (HBSBs).

As shown in FIG. 2, the storage node 104 can write copies of the delta update tuples Li:Ei:$T_p$:V (also referred to herein as "raw delta updates") for the particular delta types $T_1, T_2, \ldots, T_p$ to a single journal (also referred to herein as the "raw delta log") 205 (as illustrated by a path 242) included in the persistent memory (i.e., the NVRAM 124). In the event of a disaster, data loss, and/or data corruption, the storage node 104 can replay the raw delta log 205 to apply the delta update tuples written thereto to the metadata delta logs 204.1, 204.2, ..., 204.p included in the volatile memory (i.e., the RAM 122), thereby recovering the metadata delta logs 204.1, 204.2, ..., 204.p to a consistent state. In certain implementations, the raw delta log 205 can be configured as a ring buffer having a "head" 230 and a "tail" 232. Further, the storage node 104 can write each respective tuple Li:Ei:$T_p$:V for a particular delta type $T_1, T_2, \ldots,$ or $T_p$ to the head 230 of the ring buffer, and subsequently release allocated space for the respective tuple Li:Ei:$T_p$:V from the tail 232 of the ring buffer. As such, the raw delta log 205 can store the respective tuples Li:Ei:$T_p$:V in time order (e.g., from oldest to newest). In certain implementations, the storage node 104 can determine that the raw delta log 205 is full, initiate one or more de-staging operations to store at least some of the delta update tuples written to the respective metadata delta logs 204.1, 204.2, ..., 204.p to the metadata page store 234 (as illustrated by the paths 244, 246, ..., 248, respectively) included in the storage array 106, and subsequently release the space for the delta update tuples from the tail 232 of the ring buffer.

During operation, the storage node 104 can receive a plurality of write IO requests for one or more of the storage targets 118.1, ..., 118.m from one or more of the host computers 102.1, ..., 102.n. The plurality of write IO requests can direct the storage node 104 to write pending changes ("deltas," "delta updates") for one or more different metadata types to the respective metadata delta logs 204.1, ..., 204.p included in the RAM 122. In response to receipt of the plurality of write IO requests, the storage node 104 can write delta updates for a respective metadata type to a metadata delta log instance optimized for handling the respective metadata type. For example, the metadata delta log 204.1 can be optimized for handling the metadata type "$T_1$," and the metadata delta log 204.2 can be optimized for handling the metadata type "$T_2$." In general, the metadata delta log 204.p (in which "p" is any suitable positive integer) can be optimized for handling the metadata type "$T_p$."

With regard to the functionality of the metadata delta log 204.1 included in the RAM 122, the storage node 104 can write delta updates for the metadata type "$T_1$" to fill one or more of the first set 210 of data containers $H_1, H_2, H_3, \ldots, H_N$ with the metadata delta updates. It is noted that the first set 210 of data containers $H_1, H_2, H_3, \ldots, H_N$ included in the metadata delta log 204.1 can initially be designated as the "active" set, while the second set 212 of data containers $H_1, H_2, H_3, \ldots, H_N$ included in the metadata delta log 204.1 can initially be designated as the "de-staging" set. The storage node 104 can also write copies of delta updates ("raw delta updates") to the raw delta log 205 included in the NVRAM 124. Once one or more of the first set 210 of data containers $H_1, H_2, H_3, \ldots, H_N$ have been filled, the storage node 104 can switch the designation of the first set 210 of data containers from "active" to "de-staging," as well as switch the designation of the second set 212 of data containers from "de-staging" to "active."

In response to the switching of the "active" and "de-staging" designations for the first and second sets 210, 212 of data containers of the metadata delta log 204.1, the storage node 104 can write a first bookmark to the raw delta log 205. In certain implementations, such a bookmark can be configured as a record with several attributes, including a "type" attribute "$T_p$," specifying the metadata type handled by the metadata delta log 204.p, an "identifier" attribute "I" specifying the current designated "active" set of data containers included in the metadata delta log 204.p, and an "offset" attribute "$A_p$," specifying the current allocation offset in the raw delta log 205 (in which "p" is any suitable positive integer). The storage node 104 can also write the bookmark record having the attributes $T_p$, I, $A_p$ to a bookmark list in the RAM 122. In certain implementations, the bookmark list can be configured as a linked list (or any other suitable memory structure) having a head and a tail, and the bookmark record having the attributes $T_p$, I, $A_p$ can be written at the head of the bookmark list. The storage node 104 can then initiate a transaction commit operation (also referred to herein as a "de-staging operation") to be performed in a background process, de-staging or otherwise writing the delta updates for the respective metadata type (e.g., the metadata type "$T_1$") from the current designated "de-staging" set (e.g., the first set 210 or the second set 212) of data containers to an associated metadata page in one of the plurality of storage targets 118.1, . . . , 118.m maintained in the storage array 106.

It is noted that each of the remaining metadata delta logs 204.2, . . . , 204.p included in the RAM 122 can have the same functionality as the metadata delta log 204.1 described hereinabove. It is further noted that when one or more of the "active" set of data containers for a respective metadata delta log 204.1, . . . , or 204.p is full, the designation of the set of data containers can be switched from "active" to "de-staging," and a de-staging operation can be initiated for a respective metadata type $T_1$, $T_2$, . . . , or $T_p$ from the full set of data containers. The order of the de-staging operations for the metadata delta logs 204.1, . . . , 204.p can therefore be unpredictable. Such de-staging operations can also be relatively long processes. Most of the time, de-staging operations are performed for all of the metadata types $T_1$, $T_2$, . . . , $T_p$ to assure that the overall de-staging operation is a smooth process. In addition, for each metadata delta log 204.1, . . . , 204.p, while the "active" set of data containers are being filled, the "de-staging" set of data containers can be de-staged. Once the "de-staging" set of data containers have completely de-staged, the next switch of the "active" and "de-staging" designations can occur.

Having written raw delta updates to the raw delta log 205 for the different metadata types $T_1$, $T_2$, . . . , $T_p$, as well as written bookmarks specifying the respective metadata types $T_1$, $T_2$, . . . , $T_p$, to both the raw delta log 205 and the bookmark list, the storage node 104 can determine whether at least a first de-staging operation for delta updates of a first metadata type (e.g., the metadata type "$T_1$") and a second de-staging operation for delta updates of a second metadata type (e.g., the metadata type "$T_2$") have been performed in the background process. If the storage node 104 determines that the first de-staging operation has been performed before the second de-staging operation, the storage node 104 can remove the first bookmark having the attributes $T_1$, I, $A_1$ from the bookmark list, checking to see whether the first bookmark was removed from the tail of the bookmark list. In other words, the storage node 104 can check to see whether the first bookmark was the "oldest" bookmark in the bookmark list. If the first bookmark was indeed removed from the tail of the bookmark list, then the storage node 104 can safely perform a memory space reclaim operation to reclaim the space between a tail of the raw delta log and the first bookmark written to the raw delta log.

If the storage node 104 determines that the second de-staging operation has been performed before the first de-staging operation, then the storage node 104 can remove a second bookmark having the attributes $T_2$, I, $A_2$ from the bookmark list, checking to see whether the second bookmark was removed from the tail of the bookmark list. In other words, the storage node 104 can check to see whether the second bookmark having the attributes $T_2$, I, $A_2$ was the "oldest" bookmark in the bookmark list. If the second bookmark having the attributes $T_2$, I, $A_2$ was not removed from the tail of the bookmark list (i.e., the first bookmark remains at the tail of the bookmark list), then the storage node 104 can defer performing a memory space reclaim operation on the raw delta log 205 until the first de-staging operation for the metadata type $T_1$ has been performed in the background process.

The disclosed techniques for handling journal space in a storage cluster with multiple delta log instances will be further understood with reference to the following illustrative example, and FIGS. 3a-3g. In this example, a storage node of a storage cluster writes copies of delta updates ("raw delta updates") for different metadata types $T_1$, $T_2$, $T_3$ to a single raw delta log 302 (see, e.g., FIG. 3a) included in a persistent memory (e.g., NVRAM), and determines whether to perform a memory space reclaim operation (or defer performing a memory space reclaim operation) on the raw delta log 302. The raw delta log 302 is configured as a ring buffer having a "head" 306 and a "tail" 308. In addition, the storage node 104 writes bookmarks having attributes $T_p$, I, $A_p$ (e.g., p=1, 2, or 3) to a bookmark list 304 (see, e.g., FIG. 3d) in a volatile memory (e.g., RAM). The bookmark list 304 is configured as a linked list having a "head" 310, a "tail" 312, and a terminator node 310.

In this example, the storage node writes delta updates for the metadata type "$T_1$" to a first metadata delta log, filling one or more of a current designated "active" set of data containers with the metadata delta updates. The storage node also writes copies of delta updates ("raw delta updates") to space specified by an allocation offset "$A_1$" in the raw delta log 302 (see FIG. 3a). Once one or more of the current designated "active" set of data containers in the first metadata delta log have been filled, the storage node switches the designation of the current designated "active" set from "active" to "de-staging." Having switched the designation for the set of data containers from "active" to "de-staging," the storage node writes a bookmark "$B_1$" at the head 306 of the raw delta log 302 (i.e., at the end of the space specified by "$A_1$") (see FIG. 3a). The storage node also writes the bookmark "$B_1$" having attributes $T_1$, 1, $A_1$ at the head 310 of the bookmark list 304 (see FIG. 3d). It is noted that the identifier attribute "I" that specifies the current designated "active" set of data containers in the bookmark "$B_1$" is indicated as "1" for purposes of illustration.

Further in this example, the storage node writes delta updates for the metadata type "$T_2$" to a second metadata delta log, filling one or more of a current designated "active" set of data containers with the metadata delta updates. The storage node also continues to write raw delta updates to space specified by an allocation offset "$A_2$" in the raw delta log 302 (see FIG. 3b). Once one or more of the current designated "active" set of data containers in the second metadata delta log have been filled, the storage node switches the designation of the current designated "active" set from "active" to "de-staging." Having switched the designation for the set of data containers from "active" to "de-staging," the storage node writes a bookmark "$B_2$" at the head 306 of the raw delta log 302 (i.e., at the end of the space specified by "$A_2$") (see FIG. 3b). The storage node also writes the bookmark "$B_2$" having attributes $T_2$, 1, $A_2$ at the head 310 of the bookmark list 304 (see FIG. 3d). It is noted that the identifier attribute "I" that specifies the current designated "active" set of data containers in the bookmark "$B_2$" is indicated as "1" for purposes of illustration.

Still further in this example, the storage node writes delta updates for the metadata type "$T_3$" to a third metadata delta log, filling one or more of a current designated "active" set of data containers with the metadata delta updates. The storage node also continues to write raw delta updates to space specified by an allocation offset "$A_3$" in the raw delta log 302 (see FIG. 3c). Once one or more of the current designated "active" set of data containers in the third metadata delta log have been filled, the storage node switches the designation of the current designated "active" set from "active" to "de-staging." Having switched the designation for the set of data containers from "active" to "de-staging," the storage node writes a bookmark "$B_3$" at the head 306 of the raw delta log 302 (i.e., at the end of the space specified by "A₃") (see FIG. 3c). The storage node also writes the bookmark "B₃" having attributes T₃, 1, A₃ at the head 310 of the bookmark list 304 (see FIG. 3d). It is noted that the identifier attribute "I" that specifies the current designated "active" set of data containers in the bookmark "B₃" is indicated as "1" for purposes of illustration.

In addition, the storage node initiates one or more transaction commit operations (also referred to herein as "de-staging operations") to be performed in one or more background processes, de-staging or otherwise writing the delta updates for a respective metadata type (e.g., the metadata type "T₁," "T₂," or "T₃") from a current designated "de-staging" set of data containers to an associated metadata page in a storage target maintained in a storage array. Further, the storage node determines whether at least a first de-staging operation for delta updates of the metadata type "T₁," a second de-staging operation for delta updates of the metadata type "T₂," and a third de-staging operation for delta updates of the metadata type "T₃" have been performed in the background process(es).

Figure 3A:
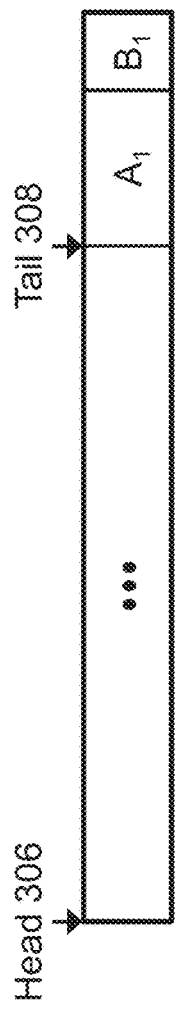
FIGS. 3a-3g are block diagrams describing an illustrative example of handling journal space in a storage cluster with multiple delta log instances.
Figure 3B:
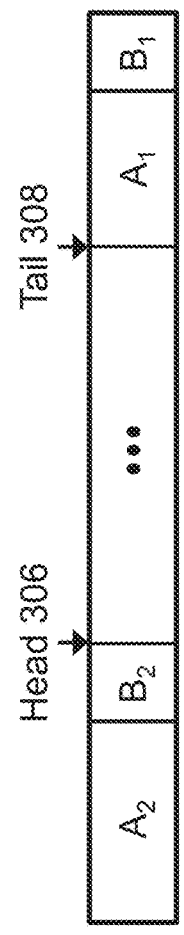
Figure 3C:
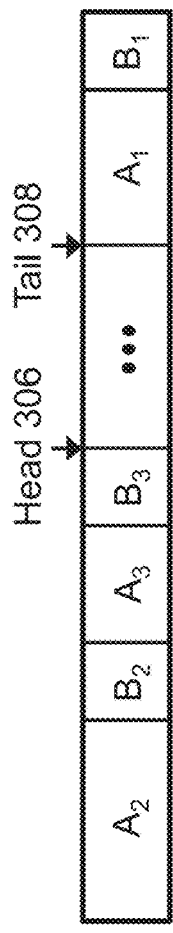
Figure 3D:
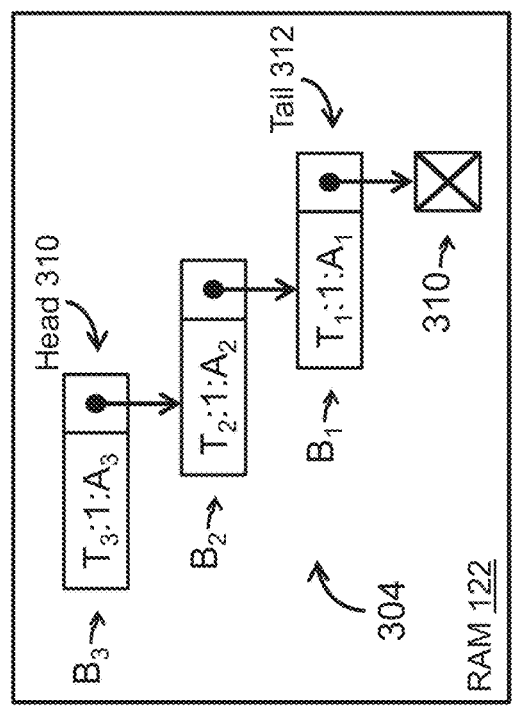
Figure 3E:
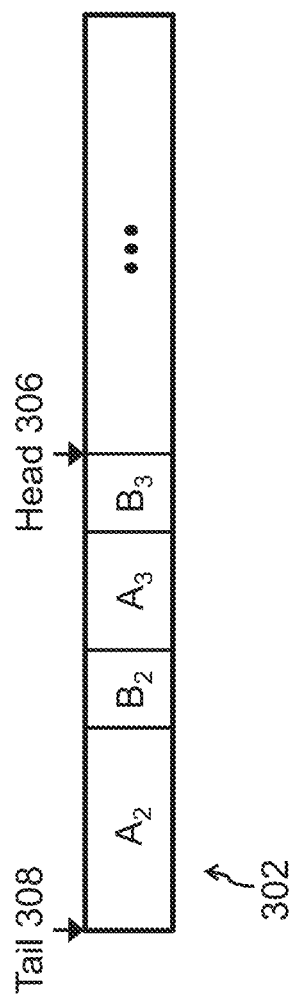
Figure 3E:
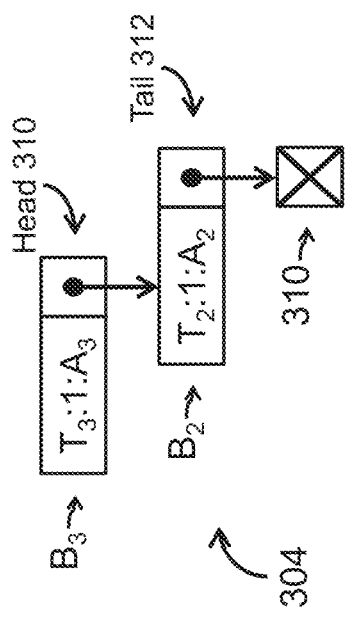

In this example, the storage node determines that the first de-staging operation for delta updates of the metadata type "T₁" has been performed before both the second de-staging operation and the third de-staging operation. In this case, the storage node removes the bookmark "B₁" having the attributes T₁, I, A₁ from the bookmark list 304, and checks to see whether the bookmark "B₁" was removed from the tail 312 of the bookmark list 304. In other words, the storage node checks to see whether the bookmark "B₁" was the "oldest" bookmark in the bookmark list 304. If the bookmark "B₁" was indeed removed from the tail 312 of the bookmark list 304 (i.e., the bookmark "B₁" was the "oldest" bookmark in the bookmark list 304), then the storage node can safely perform a memory space reclaim operation to reclaim the space specified by "A₁" (as well as the space occupied by the bookmark "B₁") in the raw delta log 302. As shown in FIG. 3e, once the bookmark "B₁" is removed from the bookmark list 304, the bookmarks "B₂" and "B₃" remain in the bookmark list 304. As further shown in FIG. 3e, the memory space reclaim operation can be safely performed by advancing the tail 308 of the raw delta log 302 to the start of the space specified by "A₂."

Figure 3F:
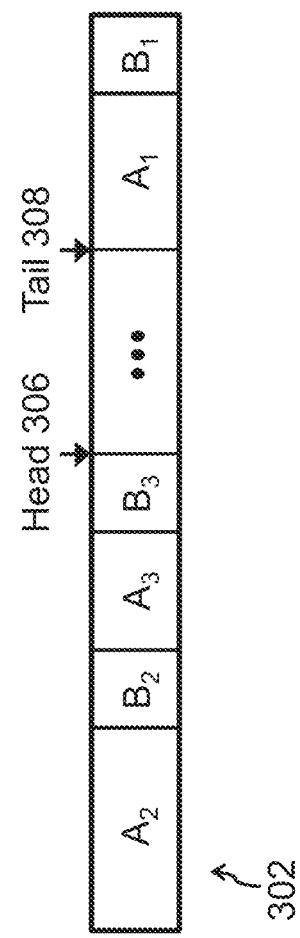
Figure 3F:
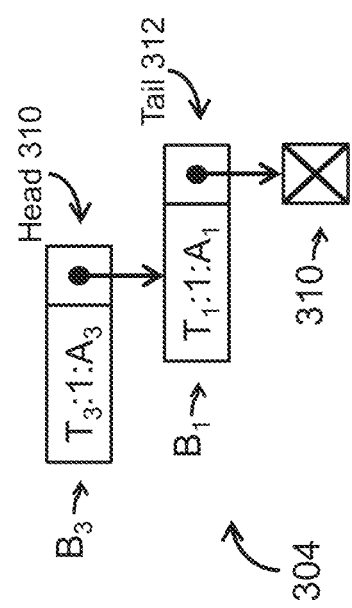

If, however, the storage node determines that the second de-staging operation for delta updates of the metadata type "T₂" has been performed before both the first de-staging operation and the third de-staging operation, then the storage node removes the bookmark "B₂" having the attributes T₂, I, A₂ from the bookmark list 304, and determines that the bookmark "B₂" was not removed from the tail 312 of the bookmark list 304. In other words, the storage node determines that the bookmark "B₂" was not the "oldest" bookmark in the bookmark list 304. As shown in FIG. 3f, once the bookmark "B₂" is removed from the bookmark list 304, the bookmarks "B₁" and "B₃" remain in the bookmark list 304. The storage node therefore defers performing a memory space reclaim operation on the raw delta log 302 until at least the first de-staging operation for delta updates of the metadata type "T₁" has been performed in the background process(es). As further shown in FIG. 3f, because the memory space reclaim operation cannot be safely performed by the storage node at this time, the space specified by "A₁," "A₂," and "A₃," as well as their corresponding bookmarks "B₁," "B₂," and "B₃," remain in the raw delta log 302.

Figure 3G:
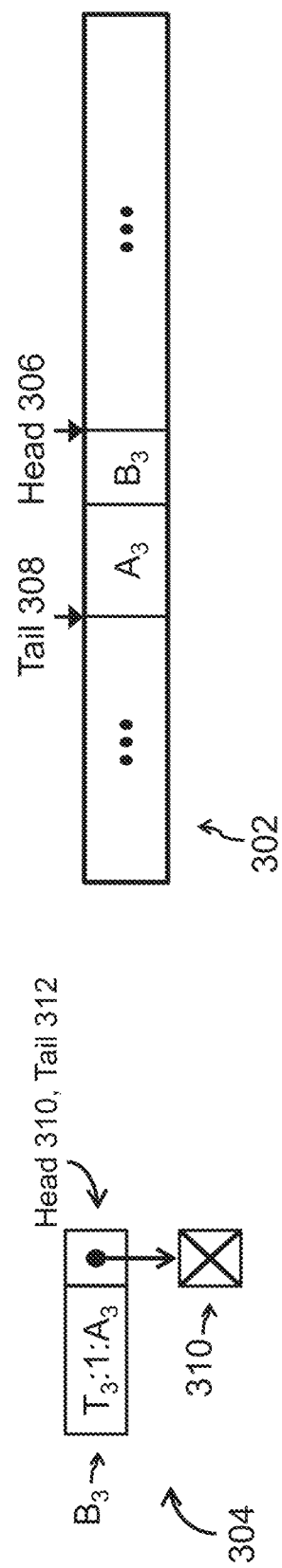

The storage node then determines that the first de-staging operation for delta updates of the metadata type "T₁" has been performed in the background process(es). Further, the storage node removes the bookmark "B₁" having the attributes T₁, I, A₁ from the bookmark list 304, and determines that the bookmark "B₁" was removed from the tail 312 of the bookmark list 304. In other words, the storage node determines that the bookmark "B₁" was the "oldest" bookmark in the bookmark list 304. As shown in FIG. 3g, once the bookmark "B₁" is removed from the bookmark list 304, only the bookmark "B₃" remains in the bookmark list 304. Because the bookmark "B₁" was indeed removed from the tail 312 of the bookmark list 304 (i.e., the bookmark "B₁" was the "oldest" bookmark in the bookmark list 304), the storage node can safely perform a memory space reclaim operation to reclaim the adjacent space specified by "A₁" and "A₂" (as well as the space occupied by the bookmarks "B₁" and "B₂") in the raw delta log 302. As described hereinabove, the storage node previously determined that the second de-staging operation for delta updates of the metadata type "T₂" has been performed in the background process(es). As further shown in FIG. 3g, the memory space reclaim operation can be safely performed by advancing the tail 308 of the raw delta log 302 to the start of the space specified by "A₃." Once the storage node subsequently determines that the third de-staging operation for delta updates of the metadata type "T₃" has been performed, the sole bookmark "B₃" having the attributes T₃, I, A₃ can be removed from the bookmark list 304, and a memory space reclaim operation can be safely performed to reclaim the space specified by "A₃" (as well as the space occupied by the bookmark "B₃") in the raw delta log 302.

Figure 4:
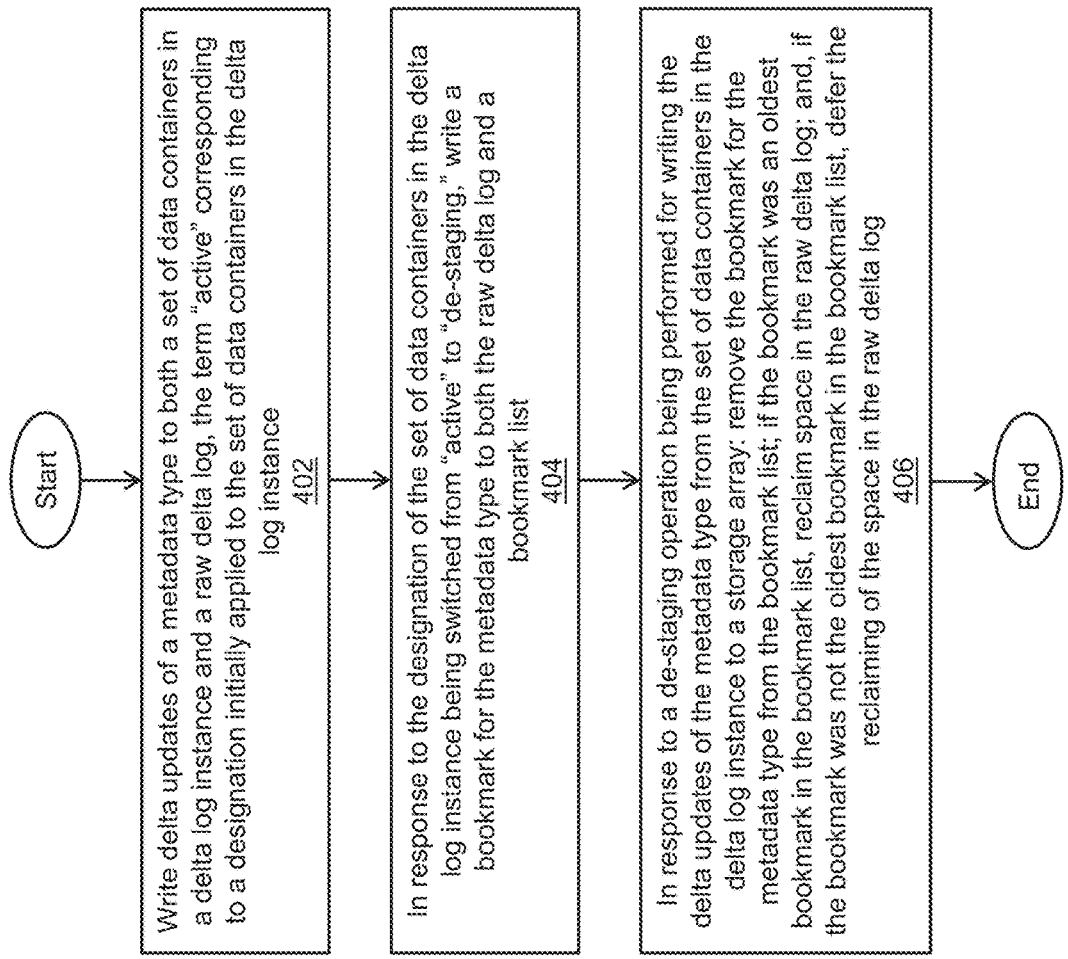
FIG. 4 is a flow diagram of an exemplary method of handling journal space in a storage cluster with multiple delta log instances.

A method of handling journal space in a storage cluster with multiple delta log instances is described below with reference to FIG. 4. As depicted in block 402, delta updates of a metadata type are written to both a set of data containers in a delta log instance and a raw delta log. The term "active" corresponds to a designation initially applied to the set of data containers in the delta log instance. As depicted in block 404, in response to the designation of the set of data containers in the delta log instance being switched from "active" to "de-staging," a bookmark for the metadata type is written to both the raw delta log and a bookmark list. As depicted in block 406, in response to a de-staging operation being performed for writing the delta updates of the metadata type from the set of data containers in the delta log instance to a storage array: the bookmark for the metadata type is removed from the bookmark list; if the bookmark was an oldest bookmark in the bookmark list, space is reclaimed in the raw delta log; and, if the bookmark was not the oldest bookmark in the bookmark list, the reclaiming of the space in the raw delta log is deferred.

Having described the above illustrative embodiments, other alternative embodiments or variations can be made and/or practiced. For example, it was described herein with reference to the illustrative example that, if the storage node determines that the bookmark "B₂" for the metadata type "T₂" was not removed from the tail 312 of the bookmark list 304 (i.e., the bookmark "B₂" was not the "oldest" bookmark, but, rather, the bookmark "B₁" was the "oldest" bookmark in the bookmark list 304), then the storage node can defer performing a memory space reclaim operation on the raw delta log 302 until an additional de-staging operation (e.g., a de-staging operation for the metadata type "T₁") has been performed in a background process. As an alternative (or addition) to the disclosed techniques, in order to address the case where such a de-staging operation for the metadata type "T₁" is not performed for an extended time (e.g., the metadata type "T₁" may have become idle), the storage node can set a minimum allowed free space threshold for the raw delta log, and monitor the free space in the raw delta log 302 to determine whether or not it is below the set threshold. If it is determined that the free space in the raw delta log 302 is below the set threshold, then the storage node can force the additional de-staging operation (e.g., the de-staging operation for the metadata type "$T_1$") to be performed, thereby assuring that at least the minimum allowed free space in the raw delta log is maintained.

It was further described herein that, in the event of a disaster, data loss, and/or data corruption, a storage node can replay the raw delta log to apply the delta update tuples written thereto to the multiple instances of metadata delta logs in the volatile memory, thereby recovering the metadata delta logs to a consistent state. As an alternative (or addition) to the disclosed techniques, the storage node can further replay the raw delta log to apply the several bookmarks written thereto to the bookmark list in the volatile memory, thereby recovering the bookmark list to a consistent state.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a file system, object storage, a virtualized device, a logical unit (LU), a logical unit number (LUN), a logical volume, a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by address. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of handling journal space in a storage cluster with multiple delta log instances, comprising:
    writing delta updates of a first metadata type to both a respective set of data containers in a first delta log instance and a raw delta log;
    in response to one or more of the respective set of data containers in the first delta log instance being filled with at least some of the delta updates, writing a first bookmark for the first metadata type to both the raw delta log and a bookmark list; and
    in response to a first de-staging operation being performed for writing the delta updates filling one or more of the respective set of data containers in the first delta log instance to a storage array:
        if the first bookmark is determined to be an oldest bookmark in the bookmark list, reclaiming at least first space between a tail of the raw delta log and the first bookmark written to the raw delta log; and
        if the first bookmark is determined not to be the oldest bookmark in the bookmark list, deferring the reclaiming of the first space in the raw delta log.

2. The method of claim 1 further comprising:
    in further response to the first de-staging operation being performed for writing the delta updates filling one or more of the respective set of data containers in the first delta log instance to the storage array, removing the first bookmark for the first metadata type from the bookmark list.

3. The method of claim 1 further comprising:
    writing delta updates of a second metadata type to both a respective set of data containers in a second delta log instance and the raw delta log; and
    in response to one or more of the respective set of data containers in the second delta log instance being filled with at least some of the delta updates, writing a second bookmark for the second metadata type to both the raw delta log and the bookmark list.

4. The method of claim 3 further comprising:
    in response to a second de-staging operation being performed for writing the delta updates filling one or more of the respective set of data containers in the second delta log instance to the storage array:
        determining that the second bookmark is not the oldest bookmark in the bookmark list; and deferring reclaiming second space in the raw delta log.

5. The method of claim 4 further comprising:
in further response to the first de-staging operation being performed for writing the delta updates filling one or more of the respective set of data containers in the first delta log instance to the storage array:
determining that the first bookmark is the oldest bookmark in the bookmark list; and
reclaiming at least the first space and the second space between the tail of the raw delta log and the second bookmark written to the raw delta log.

6. The method of claim 1 further comprising:
setting a threshold specifying a minimum allowed free space in the raw delta log.

7. The method of claim 6 further comprising:
determining that free space in the raw delta log is below the set threshold; and
forcing at least the first de-staging operation to be performed for writing the delta updates filling one or more of the respective set of data containers in the first delta log instance to the storage array.

8. A storage node of a storage cluster, comprising:
a volatile memory including a first delta log instance and a bookmark list, the first delta log instance having a respective set of data containers;
a persistent memory including a raw delta log; and
processing circuitry configured to execute program instructions to:
write delta updates of a first metadata type to both the respective set of data containers in the first delta log instance and the raw delta log;
in response to one or more of the respective set of data containers in the first delta log instance being filled with at least some of the delta updates, write a first bookmark for the first metadata type to both the raw delta log and the bookmark list; and
in response to a first de-staging operation being performed for writing the delta updates filling one or more of the respective set of data containers in the first delta log instance to a storage array:
if the first bookmark is determined to be an oldest bookmark in the bookmark list, reclaim at least first space between a tail of the raw delta log and the first bookmark written to the raw delta log; and
if the first bookmark is determined not to be the oldest bookmark in the bookmark list, defer the reclaiming of the first space in the raw delta log.

9. The storage node of claim 8 wherein the processing circuitry is further configured to execute the program instructions, in further response to the first de-staging operation being performed for writing the delta updates filling one or more of the respective set of data containers in the first delta log instance to the storage array, to remove the first bookmark for the first metadata type from the bookmark list.

10. The storage node of claim 8 wherein the processing circuitry is further configured to execute the program instructions to:
write delta updates of a second metadata type to both a respective set of data containers in a second delta log instance and the raw delta log; and
in response to one or more of the respective set of data containers in the second delta log instance being filled with at least some of the delta updates, write a second bookmark for the second metadata type to both the raw delta log and the bookmark list.

11. The storage node of claim 10 wherein the processing circuitry is further configured to execute the program instructions to:
in response to a second de-staging operation being performed for writing the delta updates filling one or more of the respective set of data containers in the second delta log instance to the storage array:
determine that the second bookmark is not the oldest bookmark in the bookmark list; and
defer reclaiming second space in the raw delta log.

12. The storage node of claim 11 wherein the processing circuitry is further configured to execute the program instructions to:
in further response to the first de-staging operation being performed for writing the delta updates filling one or more of the respective set of data containers in the first delta log instance to the storage array:
determine that the first bookmark is the oldest bookmark in the bookmark list; and
reclaim at least the first space and the second space between the tail of the raw delta log and the second bookmark written to the raw delta log.

13. The storage node of claim 8 wherein the raw delta log is configured as a ring buffer having a head and a tail, and wherein the processing circuitry is further configured to execute the program instructions to write the delta updates of the first metadata type at the head of the raw delta log.

14. The storage node of claim 13 wherein the processing circuitry is further configured to execute the program instructions to write the first bookmark for the first metadata type at the head of the raw delta log.

15. The storage node of claim 8 wherein the bookmark list is configured as a linked list having a head and a tail, and wherein the processing circuitry is further configured to execute the program instructions to write the first bookmark for the first metadata type at the head of the linked list.

16. The storage node of claim 8 wherein the processing circuitry is further configured to execute the program instructions to set a threshold specifying a minimum allowed free space in the raw delta log.

17. The storage node of claim 16 wherein the processing circuitry is further configured to execute the program instructions to determine that free space in the raw delta log is below the set threshold, and force at least the first de-staging operation to be performed for writing the delta updates filling one or more of the respective set of data containers in the first delta log instance to the storage array.

18. A computer program product including a set of non-transitory, computer-readable media having instructions that, when executed by processing circuitry, cause the processing circuitry to perform a method comprising:
writing delta updates of a first metadata type to both a respective set of data containers in a first delta log instance and a raw delta log;
in response to one or more of the respective set of data containers in the first delta log instance being filled with at least some of the delta updates, writing a first bookmark for the first metadata type to both the raw delta log and a bookmark list; and
in response to a first de-staging operation being performed for writing the delta updates filling one or more of the respective set of data containers in the first delta log instance to a storage array:
if the first bookmark is determined to be an oldest bookmark in the bookmark list, reclaiming at least first space between a tail of the raw delta log and the first bookmark written to the raw delta log; and if the first bookmark is determined not to be the oldest bookmark in the bookmark list, deferring the reclaiming of the first space in the raw delta log.

19. The computer program product of claim 18 wherein the method further comprises:

in further response to the first de-staging operation being performed for writing the delta updates filling one or more of the respective set of data containers in the first delta log instance to the storage array, removing the first bookmark for the first metadata type from the bookmark list.

20. The computer program product of claim 18 wherein the method further comprises:

writing delta updates of a second metadata type to both a respective set of data containers in a second delta log instance and the raw delta log;

in response to one or more of the respective set of data containers in the second delta log instance being filled with at least some of the delta updates, writing a second bookmark for the second metadata type to both the raw delta log and the bookmark list;

in response to a second de-staging operation being performed for writing the delta updates filling one or more of the respective set of data containers in the second delta log instance to the storage array:

determining that the second bookmark is not the oldest bookmark in the bookmark list; and deferring reclaiming second space in the raw delta log; and in further response to the first de-staging operation being performed for writing the delta updates filling one or more of the respective set of data containers in the first delta log instance to the storage array:

determining that the first bookmark is the oldest bookmark in the bookmark list; and reclaiming at least the first space and the second space between the tail of the raw delta log and the second bookmark written to the raw delta log.

\* \* \* \* \*